United States Patent
Dixon et al.

(10) Patent No.: US 9,473,520 B2
(45) Date of Patent: Oct. 18, 2016

(54) SYSTEMS AND METHODS FOR INCUBATING MALWARE IN A VIRTUAL ORGANIZATION

(71) Applicant: Verisign, Inc., Reston, VA (US)

(72) Inventors: Brandon S. Dixon, Vienna, VA (US); Gregory S. Sinclair, Alexandria, VA (US)

(73) Assignee: VERISIGN, INC., Reston, VA (US)

( * ) Notice: Subject to any disclaimer, the term of this patent is extended or adjusted under 35 U.S.C. 154(b) by 2 days.

(21) Appl. No.: 14/571,983

(22) Filed: Dec. 16, 2014

(65) Prior Publication Data

US 2015/0172305 A1    Jun. 18, 2015

Related U.S. Application Data

(60) Provisional application No. 61/916,957, filed on Dec. 17, 2013.

(51) Int. Cl.
*H04L 29/06* (2006.01)
*G06F 21/56* (2013.01)
*G06F 21/53* (2013.01)

(52) U.S. Cl.
CPC ........... *H04L 63/1416* (2013.01); *G06F 21/53* (2013.01); *G06F 21/566* (2013.01); *H04L 63/1433* (2013.01); *H04L 63/1491* (2013.01); *G06F 2221/034* (2013.01)

(58) Field of Classification Search
CPC .................................................. H04L 63/1416
USPC ......................................................... 726/23
See application file for complete search history.

(56) References Cited

U.S. PATENT DOCUMENTS

| | | | |
|---|---|---|---|
| 5,440,723 A * | 8/1995 | Arnold | G06F 21/564 714/2 |
| 7,784,099 B2 | 8/2010 | Benjamin | |
| 7,996,201 B2 | 8/2011 | Dowd et al. | |
| 2002/0184528 A1 | 12/2002 | Shevenell et al. | |
| 2008/0098476 A1 | 4/2008 | Syverson | |
| 2012/0023572 A1 | 1/2012 | Williams, Jr. et al. | |
| 2014/0090058 A1 | 3/2014 | Ward et al. | |

FOREIGN PATENT DOCUMENTS

| | | |
|---|---|---|
| EP | 2056559 A1 | 5/2009 |
| WO | 2006/107712 A2 | 10/2006 |
| WO | 2013113532 A1 | 8/2013 |

OTHER PUBLICATIONS

Extended European Search Report dated May 27, 2015, European Application No. 14198683.6 filed Dec. 17, 2014, pp. 1-6.

* cited by examiner

*Primary Examiner* — Longbit Chai
(74) *Attorney, Agent, or Firm* — Artegis Law Group, LLP

(57) ABSTRACT

Systems and methods for tracking malware operator behavior patterns in a network environment simulated for an extended period of time include a processor that causes the system to receive organizational data that describes a virtual organization, obtain additional data related to the organizational data, and provide a simulated computer network of the virtual organization based on the organizational data. The process can further cause the system to install at least one malware on the simulated computer network, monitor one or more interactions between the simulated computer network and an operator of the malware, and build a malware operator profile that characterizes the operator of the malware based on the one or more interactions, with which the operator of the malware can be identified in subsequent interactions.

20 Claims, 5 Drawing Sheets

SYSTEMS AND METHODS FOR INCUBATING MALWARE IN A VIRTUAL ORGANIZATION

CLAIM OF PRIORITY

This application claims the benefit of, and priority from, U.S. Provisional Patent Application Ser. No. 61/916,957, filed Dec. 17, 2013, which is hereby incorporated by reference in its entirety.

FIELD OF THE INVENTION

This invention relates to malware defense, and more particularly, to creating and using an incubator environment to host and study malware and malware operators.

BACKGROUND

In general, malware, or malicious software, is unauthorized hostile or intrusive software that is used to disrupt computer operations, gather sensitive information in an unauthorized manner, or gain illicit access to private computer systems. There are many types of malware, including computer viruses, ransomware, worms, trojan horses, rootkits, keyloggers, dialers, spyware, adware, malicious browser help objects, and rogue security software, among others.

Some types of malware work autonomously without any interaction from any malware operator, for example, by automatically copying data from the victim machine (e.g., passwords, cookies, personal information, etc.) and sending the data outside of the victim machine to the malware operator. Other types of malware allow a malware operator to interact directly with the victim machine and the malware. For example, malware may install a backdoor or other illicit access point that allows the malware operator to bypass normal authentication and gain illegal remote access to the victim machine, usually while remaining undetected by the victim machine's legitimate operators. For example, a very common payload for worms that replicate throughout a network is a backdoor program that is installed on each infected victim computer allowing the malware operator to access the infected computers. Similarly, trojan horses, or trojans, typically include a backdoor that allows unauthorized access to and interaction with the victim computer by the trojan's operator.

There are many different types of malware operators, such as black-hat hackers, cyber espionage organizations, governments, etc., just as there are many different types of malware. Moreover, each malware operator has individual characteristics, and each typically interacts differently with the malware and the victim machine.

Because knowledge of a malware operator may help to defend against that malware operator, it may be desirable to develop improved systems, methods, and techniques that enable legitimate operators to capture and study the actions of malware operators, without the malware operators knowing.

SUMMARY

In accordance with implementations consistent with the present teachings, a system for tracking malware operator behavior patterns in a network environment simulated for an extended period of time is disclosed. The system includes a non-transitory memory storing instructions and a processor executing the instructions to cause the system to perform a method. The method includes receiving organizational data that describes a virtual organization. Additional data is obtained that is related to the organizational data. A simulated computer network of the virtual organization is provided based at least partially on the organizational data. At least one malware is installed on the simulated computer network. One or more interactions between the simulated computer network and an operator of the malware are monitored. A malware operator profile is built that characterizes the operator of the malware based on the one or more interactions.

A computer-implemented method for tracking malware operator behavior patterns in a network environment simulated for an extended period of time is also disclosed. The method includes receiving organizational data that describes a virtual organization. Additional data is obtained that is related to the organizational data. A simulated computer network of the virtual organization is provided based at least partially on the organizational data. At least one malware is installed on the simulated computer network. One or more interactions between the simulated computer network and an operator of the malware are monitored. A malware operator profile is built that characterizes the operator of the malware based on the one or more interactions.

A non-transitory computer-readable storage medium is also disclosed. The storage medium includes instructions which when executed by a processor, cause the processor to execute a method for tracking malware operator behavior patterns in a network environment simulated for an extended period of time. The method includes receiving organizational data that describes a virtual organization. Additional data is obtained that is related to the organizational data. A simulated computer network of the virtual organization is provided based at least partially on the organizational data. At least one malware is installed on the simulated computer network. One or more interactions between the simulated computer network and an operator of the malware are monitored. A malware operator profile is built that characterizes the operator of the malware based on the one or more interactions.

BRIEF DESCRIPTION OF THE DRAWINGS

The accompanying drawings, which are incorporated in and constitute a part of this specification, illustrate implementations of the invention and together with the description, serve to explain the principles of the invention. In the drawings.

DESCRIPTION OF EMBODIMENTS

Figure 1:
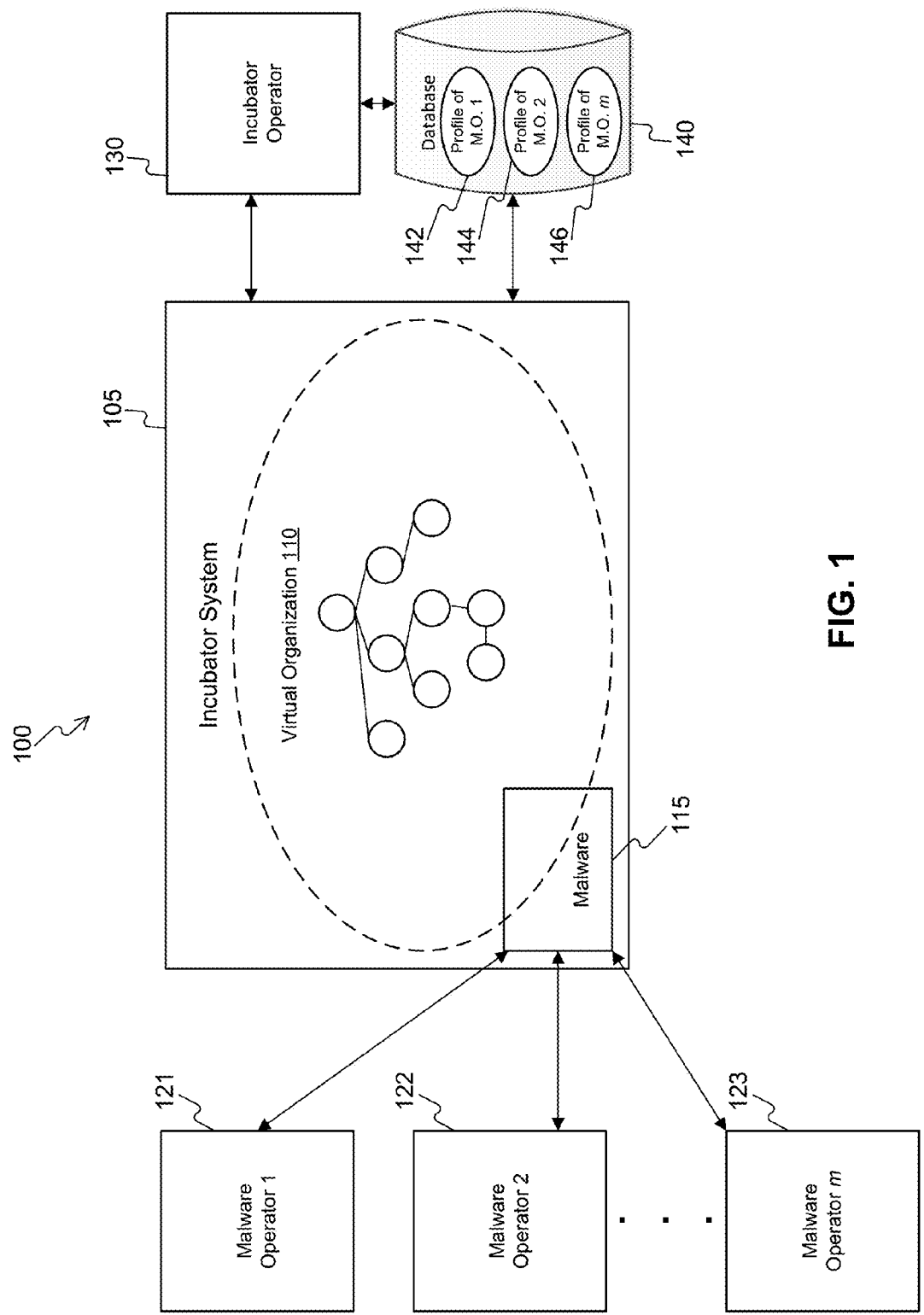
FIG. 1 is a block diagram of an example of a system for incubating malware, consistent with the principles of the invention.

This disclosure provides examples of methods, systems, and articles of manufacture for recording, capturing, observing, and studying the actions of malware operators, while remaining unknown to and undetected by the malware operators.

As noted previously, many types of malware enable a malware operator to surreptitiously access a networked system and/or a node (e.g., a computer, a machine, a device, etc.) in the networked system. The malware operator can interact via the malware with the networked system and/or the node therein, referred to hereinafter as a victim system. When the malware operator, who is unlikely to be a developer, initially accesses the victim system, he typically explores and profiles the victim system to identify whether the victim system is one that he wants to further exploit, for example, by stealing, modifying, and/or destroying sensitive content in the victim system, disrupting the victim system, turning the victim system into a bot, or performing other illicit or malicious activity. Subsequent to deciding that he wants to exploit the victim system, the malware operator may try to deploy and spread additional malware throughout the victim system so that he has more access points within the victim system and can illicitly access a greater number of nodes therein and their information. The malware operator may control the deployed malware and follow a so-called "playbook" to execute mission objectives and perform illicit collection, modification, and/or destruction of potentially sensitive material on the victim system.

The malware operator may deliver certain types of malware, such as espionage malware, to one or more victim systems in a targeted manner. The malware operator may use an espionage malware to perform attacks focused on collecting information from the victim system such as trade secrets, confidential industry and corporate data, sensitive government data, etc. The espionage malware may take advantage of the victim system's vulnerabilities, such as zero-day and patched vulnerabilities. The espionage malware may be delivered in multiple stages and may, at one or more stages, lay dormant for a period of time (e.g., several minutes or hours) in the victim system prior to running. To fully run an instance of the espionage malware delivered to a victim system, the malware operator must engage the victim system, and the malware operator and/or the espionage malware may tailor the activity performed by the instance based on the victim system's configuration, capabilities, vulnerabilities, and the like. Generally, command and control is used for only a few instances of the espionage malware.

The malware operator may also deliver other types of malware to the victim system in a generic manner, with such malware taking advantage of the victim system's patched vulnerabilities. Such malware may be delivered in a single stage and may install and run quickly after delivery to the victim system, and may do so without interaction with the malware operator. Such malware may install anywhere and be target agnostic, i.e., instances of such malware may run in the same manner regardless of the victim system's configurations and capabilities. Generally, command and control is used for many instances, e.g., hundreds or thousands, of such malware.

In accessing, exploring, and exploiting a victim system, the malware operators may perform a number of different actions, and each individual malware operator may perform these actions in a manner that provides a sort of signature or profile that is unique to, or closely identified with, each individual malware operator. For example, a first malware operator may typically access the victim system at certain times of the day and perform actions in a certain sequence typical to him, while a second malware operator may typically access the victim system at different times of the day and perform actions in a different sequence typical of him. Thus, different malware operators may be identifiable or distinguishable by the ways in which each malware operator interacts with the victim system.

Examples of methods, systems, and articles of manufacture described in the present disclosure provide an "incubator system" that includes at least one virtual organization and simulates, reproduces, or otherwise mimics a real victim system, such that malware operators are enticed to interact with the incubator system and the virtual organization, thinking that the virtual organization is the real victim system and without realizing that the virtual organization is provided by the incubator system. The incubator system can monitor record, log, or otherwise capture the actions of the malware operators that interact with the incubator system and/or the virtual organization, allowing the development of profiles or signatures which describe, and can be used to identify each individual malware operator that interacts with the incubator system and/or the virtual organization. In some implementations, the incubator system can also allow the incubator operators to observe and study each malware operator in real-time as the malware operator interacts with the incubator system, as well as making recordings of each malware operator's interactions with the incubator system.

The incubator system and the virtual organization entice and encourage malware operators to interact because they appear to be the computer networks and systems of real corporations and organizations, and recording the malware operators' interactions with the virtual organization allows one or more incubator operators to discover what the malware operators are likely to do on the computer networks and systems of real organizations. Various implementations consistent with this disclosure automatically create at least one virtual organization's computer network environment that looks like a real network, having users logged in, real documents in storage, real applications installed on various machines, etc., and such implementations have the diagnostic ability to track every action taken, every file copied, etc., by each malware operator. In general, the more that the malware operators interact with the incubator system and virtual organization, the better, as everything that occurs in this environment is tracked and recorded, thus allowing the incubator system to build intelligence on each malware operator.

In various embodiments, the incubator system can provide short-term and long-term analysis environments that emulate target systems, which can be real or fake, with complete logging of registry, file system, process, and/or network activity streams in real-time. The incubator system can log the activity streams on a per-machine basis for machines in the analysis environments. One or more incubator operators can use the incubator system to design and/or tailor at least one analysis environment that emulates at least one target system likely to appeal to targeted malware operators, such as by selecting one or more targeted malware for execution in the analysis environment and/or providing targeted content that would attract the targeted malware operators. The incubator system can dynamically build the analysis environment, configure the analysis environment's egress point(s) and router(s), plant the targeted malware and/or content in the analysis environment, monitor the targeted malware and/or content in the analysis environment, and log streams of inter- and/or intra-environment activity to database servers for near real-time analysis. In doing so, the incubator operators can gather intelligence on the targeted malware operators, such as the targeted malware operators' activities, tools, and methods. Examples of activities include the malware operators' executed commands (including typos and other idiosyncrasies), content of interest such as data, folders, and files (e.g., sensitive documents, configuration files, etc.), duration of activity, access time and locations, and the like. Examples of tools include additional malware stages and infrastructure, legitimate third-party tools, program switches and search methods, and the like. Examples of methods include the manner and/or means through which the malware operators spread malware on the analysis environment, post-exfiltration document processing, interactions of the targeted malware and/or malware operators with a command-and-control node, and the like. After completing the target network emulation, the incubator system can archive the analysis environment and information gathered therefrom.

Furthermore, by deploying preemptive monitoring and defenses in the virtual organization, the incubator system can profile the malware operators' activities and study the malware operators' collection goals. In doing so, the incubator system provides the incubator operators with the tools and data to understand and replicate the malware operators' playbook, which can include the malware operators' common plays. Common plays among malware operators include, for example, spreading and using early-stage malware to automate initial data collection on at least one victim system, manually fingerprinting the victim system subsequent to infecting the victim system, performing sanity checks on malware installed in the victim system, deploying additional tools and/or payloads onto the victim system, searching for data and documents and/or exfiltrating them from the victim system, performing post-exfiltration processing, moving laterally within the victim system or to other systems connected to the victim system, and the like.

Thus, the incubator system differs from honeypots, honeynets, and sandboxes, which run and monitor vulnerable services in generic environments and do not plant additional content to lure attackers, with the attackers entering on their terms by exploiting the vulnerable services. The generic environments are static and reverted upon completion, and data logs from the generic environments are collected and disseminated on teardown.

Overview

Figure 5:
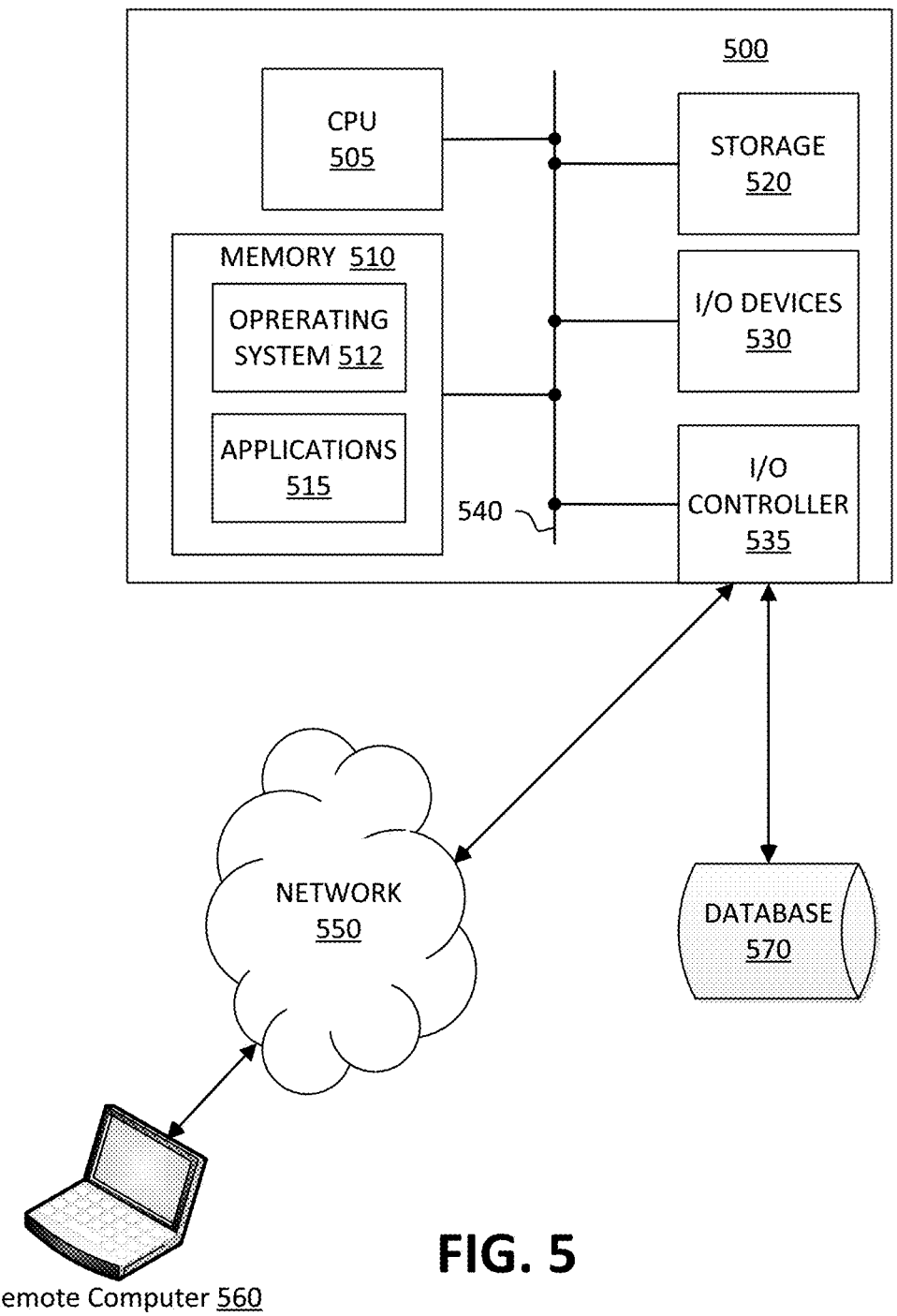
FIG. 5 is a block diagram of an exemplary computing system that may be used to implement embodiments consistent with the principles of the invention.

FIG. 1 is a block diagram of an example of a system 100 for incubating malware, consistent with the principles of the invention. In the example shown, an incubator system 105 includes at least one virtual organization 110 and at least one malware 115. In various implementations, the incubator system 105 can be any number of real and/or virtual computing machines that host and run the real and/or virtual machines that make up the virtual organization 110, such as, for example, a computing system as illustrated in FIG. 5.

In the example system 100 as shown in FIG. 1, the incubator system 105 is communicatively connected to an incubator operator 130 that controls and operates the incubator system 105. An example of the incubator operator 130 includes an organization that defends companies against malware and hackers. The incubator operator 130 can use the incubator system 105 to design, tailor, and/or build one or more analysis environments (e.g., the virtual organization 110) to emulate at least one victim system that is likely to appeal to one or more targeted malware operators. For example, the incubator operator 130 can select the malware 115 for execution in the virtual organization 110 and/or provide targeted content that would attract interactions with a set of malware operators 121-123. The malware 115 can be communicatively connected to the malware operators 121-123 and be purposely run in the victim system in the virtual organization 110 to attract interactions with the malware operators 121-123. In general, any of the malware operators 121-123 may be any individual(s) who accesses the incubator system 105 and/or the virtual organization 110 via the malware 115 without permission or authorization from the incubator operator 130. Generally, the malware operators 121-123 are bad actors who want to harm or steal information from organizations and who are unaware that the virtual organization 110 is not the computer network of a real-life organization.

The incubator system 105 can dynamically build the virtual organization 110, configure one or more egress points and routers of the virtual organization 110, plant and monitor the malware 115 and/or content in the virtual organization 110, and log streams of inter- and/or intra-organizational activity to at least one database 140 for near real-time analysis. The incubator operator 130 can monitor and track, in real-time, the operations and activities of the incubator system 105, the virtual organization 110, and the malware 115. In various implementations, the incubator system 105 has the diagnostic ability to note, record, or otherwise track every action taken, every file accessed, and in general everything that occurs in the incubator system 105 and the virtual organization 110, so that the incubator operator 130 can track and record activities of the malware operators 121-123.

In various implementations, the virtual organization 110 is a fake environment that is created to look like the system, network, and/or machines of a real company or organization or other real entity. As noted above, the virtual organization 110 may be designed to closely simulate a real organization so that the malware operators 121-123 are fooled, tricked, or misled to believe that they are interacting with the computing resources of a real organization. In various implementations, the virtual organization 110 may simulate a network of computers that belong to a specific corporation, and include simulations of users (e.g., employees) some of whom are either logged in or not logged in, real documents, real webpages, and the like. In most implementations, the virtual organization 110 may be organized to mimic a real corporate network. Thus, the virtual organization 110 is a fake environment that looks like a real company or entity to the malware operators 121-123. Subsequent to completing the simulation of the real organization, the incubator system 105 can archive the virtual organization 110 and information gathered therefrom.

In various implementations, the network of the virtual organization 110 typically includes a domain controller and one or more hosts, which can include or run a System Event Monitor ("sEM") application that logs the activities of all processes. For example, the sEM application can record all file activity, registry activity, network activity, and/or activities involving processes and threads that are created and destroyed in the incubator system 105. The incubator system 105 can log the activities on a per-machine basis for machines in the virtual organization 110. The sEM application can be implemented using a driver in the kernel that records activities and events, and the incubator system 105 can include a service that polls the sEM driver for information associated with the recorded activities and events, packages the information into tracking information, and sends the tracking information to the incubator operator 130 and/or the database 140, for example via a local router (not shown). In various implementations, recording and logging of events and activities can go on whether or not one or more of the malware operators 121-123 are accessing the victim machine in the virtual organization 110.

The incubator system 105 can send tracking information to the database 140 that is accessible by the incubator operator 130. In various implementations, the incubator operator 130 can study, analyze, or review the tracking information in real-time. The incubator system 105 can include a monitoring program (not shown) that is associated with the database 140 and configured to alert the incubator operator 130 (via, e.g., text messages, emails, etc.) when the incubator system 105 detects the occurrence of one or more activities outside of the idle environment norm (e.g., an idle baseline), as this may indicate that one or more of the malware operators 121-123 is interacting with the virtual organization 110.

The incubator system 105 and/or the incubator operator 130 can create a set of profiles 142-146 for the malware operators 121-123 based on intelligence gathered and provided by the tracking capabilities of the incubator system 105. The profiles 142-146 can include information characterizing the actions, interactions, attributes, etc., of the malware operators 121-123, such as the transmission control protocols used by each malware operator, characterizing sequences of operations used by each malware operator, average log-on time and duration associated with each malware operator, etc. The malware operator profiles 142-146 of the malware operators 121-123 can include information associated with the malware operator 121-123, such as when and for how long the malware operator 121-123 gained and maintained access to the virtual organization 110 and/or at least one victim system in the virtual organization 110, information indicating a geographical area from which the malware operator originates, a list of applications or software that the malware operator 121-123 deployed on the victim system and/or the virtual organization 110, information describing any communication channels used by the malware operator 121-123, information describing any other malware operators to which the malware operator 121-123 handed off access to the victim machine and/or virtual organization 110, and the like. The profiles 142-146 allow for later identification of a malware operator on the same or different machines, for example in the form of "this activity meets the pattern of operator XYZ, who is based in the country of Lithuania."

Moreover, by building profiles 142-146, the incubator system 105 allows the incubator operator 130 to gather intelligence on the malware operators 121-123, such as their activities, tools, and methods. Activities performed by and/or are associated with malware operators 121-123 include executed commands (including typos and other idiosyncrasies), accessed/modified/deleted content such as data, files, and folders (e.g., sensitive documents, configuration files, etc.), and the like. Activity-related information includes duration of each activity, access time and locations, and the like. Tools used by and/or are associated with the malware operators 121-123 include infrastructure (e.g., a communication channel, a command-and-control server, etc.), additional malware stages, legitimate third-party tools (e.g., archive utilities), program switches and search methods, and the like. Methods used by and/or are associated with the malware operators 121-123 include the manner and/or means through which the malware operators 121-123 spread additional malware in the virtual organization 110, post-exfiltration document processing, interactions of the malware 115 and/or the malware operators 121-123 with a command-and-control server (not shown), and the like. The incubator system 105 can put information included in one or more of the profiles 142-146 into reports and distribute the reports to the public or to clients of the incubator operator 130.

Furthermore, the incubator system 105 can use the profiles 142-146 to help the incubator operator 130 identify common "plays" by one or more of the malware operators 121-123, such as sequences of activities performed by the malware operators 121-123 to gain access to and subsequent to gaining access to the virtual organization 110. Examples of common plays include spreading and using malware to gain access to and automate an initial collection of data associated with a victim system, manually fingerprinting the victim system subsequent to gaining access to the victim system, performing sanity checks on malware installed on the victim system, deploying additional tools and/or payloads onto the victim system, searching for and exfiltrating data and files from the victim system, moving laterally within the victim system or to another system connected to the victim system, and the like.

For example, at least one of the malware operators 121-123 may infect at least one victim system in the virtual organization 110 with a first-stage malware, and the malware operator 121-123 may use the first-stage malware to gain access to the victim system and automate an initial collection of data associated with the victim system, for instance, by grabbing running processes and/or services, collecting hard disk and/or process details, identifying one or more external IP addresses, grabbing one or more hostnames, determining whether or not the victim system is a virtual machine, etc. Subsequent to gaining access to the victim system, the malware operator 121-123 may manually fingerprint the victim system, for instance, by executing a first type of commands such as 'ipconfig /all', 'net view', 'net localgroup administrators', 'traceroute', etc., or a second type of commands such as 'tasklist /v', 'net start', 'net view /domain', 'netstate -ano', etc. Based on the type of commands executed by the malware operator, the incubator system 105 and/or the incubator operator 130 can make a preliminary determination on whether the malware operator is an opportunistic operator or a focused operator. In some instances, the malware operator may run only the fingerprinting commands on the victim system as the malware operator 121-123 decides whether or not to further explore and/or exploit the victim system.

Continuing with the above example, the malware operator 121-123 may perform a sanity check on malware installed on the victim system, for instance, by checking folder locations for malware (e.g., by executing commands such as 'cd C:\DOCUME~1\XXX\LOCALS~1\Temp', 'cd ~hf~', 'diR', etc.) or by cleaning up if the malware operator wants to cover his tracks (e.g., by executing commands such as 'taskkill /im adobere.exe /f', 'net time \\127.0.0.1', 'at \\127.0.0.1 2:24 cmd /c "del \"C: \Documents and Settings\XXX\Local Settings\Temp\~hf~\adobe_sl.exe\"", etc.). The malware operator 121-123 may deploy additional tools and/or payloads onto the victim system, for instance, by deploying additional malware or legitimate tools to assist in exfiltration, during which the malware operator 121-123 may obtain additional tools through a secondary infrastructure and/or change filenames of legitimate software in ways that could aid the incubator system 105 in detecting the payload. Examples of legitimate tools include Cain and Abel, NBTScanner, gsecdump, pstools, dynamic linking libraries that enable functionality inside of remote administration tools, archive utilities (e.g., RAR utilities, ZIP utilities, etc.), drive enumerators, etc. The malware operator 121-123 may search for and exfiltrate data and files from the victim system, for instance, by locating content of interest (e.g., data, files, folders, etc.) on the victim system, obtaining at least one exfiltration point such as an archive file (e.g., a RAR file, a ZIP file, etc.), a network port or connection (e.g., an FTP connection, an HTTP connection, etc.), etc., and exfiltrating the content of interest through the exfiltration point. The malware operator 121-123 may attempt to exfiltrate the content of interest either in bulk (e.g., by extracting all files and folders that are not system data) or selectively (e.g., by checking folders and files for specific content of interest and extracting only the specific content of interest). The malware operator 121-123 may also perform post-exfiltration processing, for instance, by opening/modifying/closing the exfiltration point or opening/executing exfiltrated content of interest (e.g., opening and/or executing a stolen file on a command-and-control server through a proxy or source network). In some instances, the incubator system 105 can observe the post-extraction processing performed by the malware operator 121-123. The malware operator 121-123 may attempt to move laterally within the victim system or to another system connected to the victim system in the virtual organization 110.

The incubator system 105 and the virtual organization 110 are very different from so-called "honeypots," "honeynets," and "sandboxes" because the incubator system 105 and the virtual organization 110 provide a much higher level of simulation sophistication and realism than a honeypot, honeynet, or sandbox. For example, a honeypot or sandbox typically is and/or appears to be a standalone machine that has very few resources, etc., which makes them easy to detect by modern malware operators, using virtual machine checks, and other common information-gathering actions.

A honeypot or sandbox does not simulate an entire organization, whereas various implementation of the incubator system 105 create a virtual organization 110 that mimics a realistic corporate environment with a realistic infrastructure. For example, unlike a honeypot, honeynet, or sandbox, which may have a small network with one to five nodes where all the nodes are equal without any one having any sort of importance or value, the virtual organization 110 may be realistically configured in a manner associated with a corporation, including nodes of varying importance based on how the corporation is supposed to look. Another difference is that honeypots, honeynets, and sandboxes do not have the extensive logging of most or all system activities, as provided by the incubator system 105 and the database 140 of the example shown in FIG. 1.

Yet another difference from honeypots, honeynets, and sandboxes is that the incubator system 105 runs for long periods of times—on the order of days to months—so as to look like a real corporation or organization; whereas honeypots, honeynets, and sandboxes run for a very short period of time—on the order of minutes or hours. In fact, some types of malware are designed to detect and defeat honeypots/nets and sandboxes by using a timed delay of hours before attempting any action, as after such a delay most honeypots/nets and sandboxes will no longer be active. In one embodiment, the incubator system 105 runs continuously for more than one day, more than one week, or more than one month.

Automatic Creation of the Virtual Organization

Figure 2:
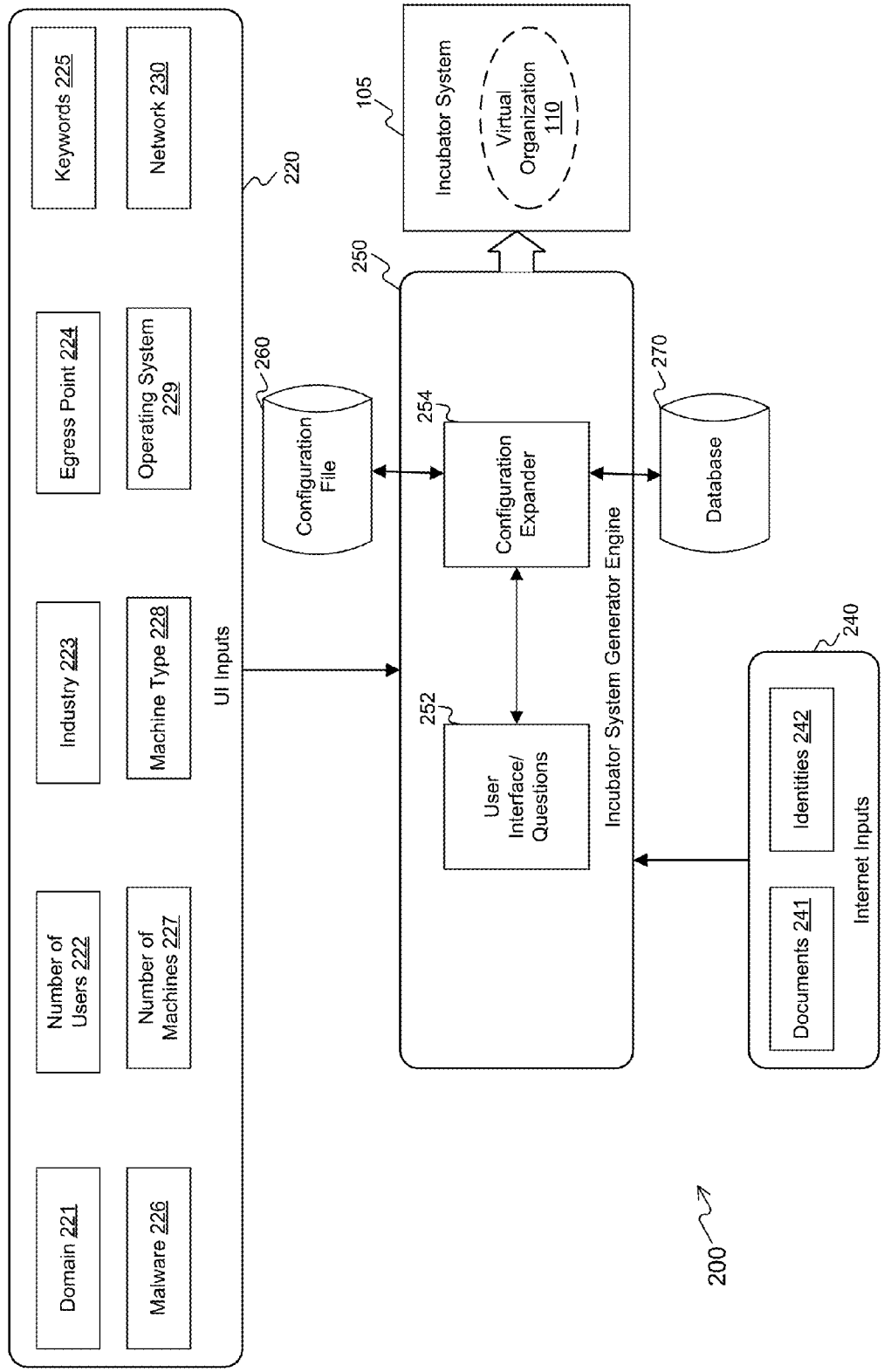
FIG. 2 is block diagram of an example of a generator system for incubating malware, consistent with the principles of the invention.

FIG. 2 is block diagram of an example of a generator system 200 for incubating malware, consistent with the principles of the invention. As shown, the system 200 includes an incubator system generator engine 250, which includes a user interface ("UI")/questions component 252 and a configuration expander component 254. In various implementations, the incubator system generator engine 250 and components therein can be implemented in software as instructions that are executed by a general purpose computing system which includes a processor, such as, for example, a server, notebook computer, or a computing system as illustrated in FIG. 5.

In various implementations, the UI/questions component 252 can generate a UI, such as a graphical user interface ("GUI") that appears on the display (e.g., a screen or a visual interface) of a computing system, which prompts and interacts with a user (e.g., the incubator operator 130) to gather, via UI inputs 220, a variety of organizational data describing a virtual organization 110 to be generated by the incubator system generator engine 250. The UI can be a web-based UI, such as a GUI that is presented as web page and accessed using a browser. The user may fill out a form to define or otherwise specify the organizational data for the virtual organization 110, including, for example, characteristics, features, and attributes of the virtual organization 110. The form can present questions that ask for specific information included in the UI inputs 220 as illustrated in FIG. 2. More particularly, the UI inputs 220 can include information describing at least one domain 221, which can be the domain that the incubator system 105 and the virtual organization 110 will simulate, such as, for example, "verisign.net" or "example.com".

The UI inputs 220 can include information describing a number of users 222, which can indicate how many virtual users the incubator system generator engine 250 is to automatically create in the active directory of the virtual organization 110.

The UI inputs 220 can include information describing at least one industry 223, which can indicate to the incubator system generator engine 250 how to structure the virtual organization 110 to be consistent with a specified industry, including looking up personnel hierarchy or job positions (and an appropriate number of them based, e.g., on the number of users 222) in a predefined table of personnel hierarchy or job positions related to that industry, which are then used to describe and/or populate the virtual users of the virtual organization 110. For example, in the engineering industry, the personnel hierarchy can include several levels of software and electrical engineers, four chief executive level positions, and a human resources administrator. In general, the incubator system generator engine 250 can automatically create specific virtual users, having specific jobs positions and other details that are consistent with the personnel hierarchy and real-life users in the specified industry and will place data representing the users into a configuration file 260. In some embodiments, census data, leaked password lists, or other sources of real-life information can be used to make the virtual users simulate real-life users.

The UI inputs 220 can include information describing a network schema and number of machines 227, which can indicate to the incubator system generator engine 250 how to structure the virtual computer network of the virtual organization 110, as will be visible to and/or "seen" by the malware operators 121-123 and the malware 115. In general, the incubator system generator engine 250 will automatically create, lookup, or otherwise generate a network schema corresponding to the user-entered network schema and number of machines 227 and will place data representing the network schema into a configuration file 260. Various implementations can distinguish between the number of real machines in the virtual organization 110, which can be machines that malware operators 121-123 can interact with, and "multihosts" or virtual machines, which fill space and add directories in the network of the virtual organization 110 to make it appear more realistic. Although they cannot interact with the multihosts, malware operators 121-123 can nonetheless "see" them, for example, by using a common command like "net view," which will show the multihosts as multiple machines that are online in the network of the virtual organization 110, as they report to the domain controller 340.

The UI inputs 220 can include information describing at least one egress point 224, which can indicate to the incubator system generator engine 250 a specific geographic location (e.g., a country, state, or city) where the virtual organization 110 will access a wide area network such as the Internet. To malware operators 121-123, the virtual organization 110 will have an IP address corresponding to the egress point 224 and so will appear to be located at the indicated geographic location. In some implementations, the incubator system 105 can have access to a limited number of virtual private network access points, and the UI component 252 can present a list or menu of those access points to the user to choose from. After user selection, the incubator system generator engine 250 can place data representing the selected egress point 224 into the configuration file 260, and later generate a virtual organization 110 that is paired with that egress point so that virtual organization traffic goes in and out of that access point location.

The UI inputs 220 can include information representing one or more keywords 225 (e.g., in the form of comma separated words), which can describe or characterize various desired features of the virtual organization 110 that the incubator system generator engine 250 will create. In various implementations, the incubator system generator engine 250 can use the keywords to gather Internet inputs 240 that are used to create the realistic virtual organization 110, as described further below. The incubator system generator engine 250 can place data representing the specified keywords 226 into the configuration file 260.

The UI inputs 220 can include information describing or identifying at least one malware 226, which the incubator system generator engine 250 can run or execute in a physical or virtual machine that is part of the virtual organization 110 in the incubator system 105. For example, the malware input 226 can identify a malware program or application 115 that is run by a computer in the virtual organization 110 of the incubator system 105, as shown in FIG. 1. The incubator system generator engine 250 can place data representing the specified malware 226 into the configuration file 260.

The UI inputs 220 can also include information describing or identifying at least one machine type 228, which the incubator system generator engine 250 can use or simulate in the virtual organization 110 in the incubator system 105. The incubator system generator engine 250 can place data representing the specified machine type 228 into the configuration file 260.

The UI inputs 220 can also include information describing or identifying at least one operating system 229, which the incubator system generator engine 250 can execute on the physical and/or virtual machines in the virtual organization 110 in the incubator system 105. The incubator system generator engine 250 can place data representing the specified operating system 229 into the configuration file 260.

The UI inputs 220 can also include information describing or identifying at least one network 230, which the incubator system generator engine 250 can use to simulate or assign IP address(es) and IP network space(s) on the physical and/or virtual machines in the virtual organization 110 in the incubator system 105. The incubator system generator engine 250 can place data representing the specified address(es) and the network 230 into the configuration file 260.

Referring again to the user-input keywords 225 that describe or characterize wanted features of the desired virtual organization 110, various implementations of the incubator system generator engine 250 can apply the keywords 225 to an Internet search engine or other information gathering technique in order to gather Internet inputs 240, which can include information, documents 241, links, identities 242, and the like, all of which can be used to make the virtual organization 110 appear more realistic. For example, the incubator system generator engine 250 can search a network, such as the Internet, for documents 241 (e.g., files that end in .doc, .docx, .pdf, etc.), that contain or relate to the keywords 225. In some implementations, the incubator system generator engine 250 can download or otherwise collect the documents 241 identified by the search, and later distribute/store the documents 241 randomly in the directories on the machines that make up the virtual organization 110. Thus, any of the malware operators 121-123 that tries to illicitly gather documents from the virtual organization 110 will find and copy real documents that appear relevant to the virtual organization 110.

Similarly, the incubator system generator engine 250 can search a network, such as the Internet, for persons or identities 242 (e.g., information about a person's name, address, occupation, job duties, education, etc.), that contain or relate to the keywords 225. In some implementations, the incubator system generator engine 250 can search census data to find identities 242 that fit keywords related to the geography, company name, education, etc. associated with the desired virtual organization 110, and later assign them a job title within the virtual organization 110. In some implementations, when the virtual organization is mimicking a real-world organization, the incubator system generator engine 250 can search a website that provides career details and resume-like information, such as the LinkedIn™ website, to find people who actually work at the company and use them and their real positions to populate the virtual organization 110 with users. Thus, any of the malware operators 121-123 that tries to illicitly gather user information from the virtual organization 110 will find information about users that are compatible with the virtual organization 110.

In the implementation shown in FIG. 2, after the incubator system generator engine 250 receives the UI inputs 220 and the Internet inputs 240, which can be stored in a configuration file 260 as mentioned above, the configuration expander module 254 builds upon those basic inputs and automatically creates everything else that is needed to generate the virtual organization 110 that will run in the incubator system 105. For example, the configuration expander module 254 automatically creates users, creates their passwords, associates each user with a specific job title, creates the upstream network of the Internet, creates the exit stream, creates real and virtual machines to implement the local network schema, creates tasks that need to be executed by each machine when being configured, distributes documents and applications to the machines in the network, and finally downloads and runs the specified malware on one of more of the machines of the virtual organization 110, etc. Thus, a small amount of configuration information entered by the user (e.g., the incubator operator 130) to describe a desired virtual organization 110 is expanded to a full configuration (e.g., virtual organization 110) that simulates an enterprise that has been infected with the specified malware 115.

From the perspective of a user (e.g., an incubator operator 130), creating the virtual organization 110 starts off by simply providing a small amount of information describing the desired virtual organization 110 via a UI, such as a web-based GUI. As noted above, in various implementations the user can define the network they want, how many machines they want, (e.g., how many real machines and how many multihosts or virtual machines, which simulate a real machine without actually being a real machine), how many users, etc., as discussed with respect to the UI inputs 220. In some implementations, this information is all put into a configuration file 260, and the incubator system generator engine 250 can also or alternatively store the information in a configuration database 270.

Table 1 below shows an example of information from a configuration file (e.g., configuration file 260), which the incubator system generator engine 250 can use to create a virtual organization 110 as specified by UI inputs 220 and Internet inputs 240. In some implementations, the information from Table 1 can be used to create a Java Script Object Notation ("JSON") object that is processed by the system.

TABLE 1

An Example of Information Contained in a Configuration File

| | | | | | | |
|---|---|---|---|---|---|---|
| Domain | example.com | | | | | |
| NetBIOS Domain | EXAMPLE-AD | | | | | |
| Industry | Technology Services | | | | | |
| Keywords | satellites, missiles, defense | | | | | |
| Employees | First Name | Last Name | Username | Password | Gender | Job Title |
| | Jane | Smith | jsmith | r0bsM0m! | Female | Lead Engineer |
| | Bob | Jones | bjones | passw0rd? | Male | Administrative Assistant |
| | . | | | | | |
| | . | | | | | |
| | . | | | | | |
| Exit Point | VPN Server | | vpn1.vpnprovider.com | | | |
| | Geographic Location | | San Francisco, CA | | | |
| | Geographical Region | | North America | | | |
| Naming Schemes | Users | Schema Type | {firstInitial}{lastName} | | | |
| | | Prefix | None | | | |
| | | Random Number Length | 0 | | | |
| | Hosts | Schema Type | {prefix}-{username} | | | |
| | | Prefix | EX | | | |
| | | Random Number Length | 2 | | | |
| | Servers | Schema Type | {function}{randomNumber} | | | |
| | | Prefix | EX | | | |
| | | Random Number Length | 2 | | | |
| Infrastructure | opNetwork | Switch | Name | exampleSwitch | | |
| | | | Ports | 48 | | |
| | | | VLAN | 0 | | |
| | | Network | 10.3.94.0/23 | | | |
| | | Gateway | 10.3.94.1 | | | |
| | | DNS | 10.3.94.56 | | | |
| | | Router | Name | router 1 | | |
| | | | Interface0IP | 192.168.1.4 | | |
| | | | Interface1IP | 10.3.94.1 | | |
| | | | Interface1MAC | 00:53:34:09:34:01 | | |
| | | | Interface2IP | 192.168.3.2 | | |
| | | DHCP | StartIP | 10.3.94.2 | | |
| | | | EndIP | 10.3.95.250 | | |
| | egressNetwork | Switch | Name | exampleSwitchEgress | | |
| | | | Ports | 8 | | |
| | | | VLAN | 0 | | |
| | | Network | 192.168.3.0/30 | | | |
| | | Gateway | 172.18.0.1 | | | |
| | | Router | Name | egressRouter2 | | |
| | | | Interface0IP | 192.168.3.1 | | |
| | | | Interface1IP | 172.18.0.2 | | |
| Multihost Servers | ServerName | multiHost0 | | | | |
| | Active | True | | | | |
| | IP | 10.3.95.253 | | | | |
| | InactiveHosts | Hostname | IP | | | |
| | | EX-BJONES | 10.3.94.39 | | | |
| | | EX-CBURNS | 10.3.95.78 | | | |
| | | . | | | | |
| | | . | | | | |
| | | . | | | | |

TABLE 1-continued

An Example of Information Contained in a Configuration File

|  |  |  |  |
|---|---|---|---|
|  | ServerName | multiHost1 |  |
|  | Active | True |  |
|  | IP | 10.3.95.250 |  |
|  | InactiveHosts | Hostname | IP |
|  |  | EX-HSIMPSON | 10.3.95.68 |
|  |  | EX-NFLANDERS | 10.3.94.69 |
|  |  | . |  |
|  |  | . |  |
|  |  | . |  |
|  |  | . |  |
| Domain Controllers | Hostname | DC03 |  |
|  | IP | 10.3.94.56 |  |
|  | Template | Windows 2003 SP2 |  |
|  | MAC | 00:69:69:01:03:05 |  |
|  | Screen Resolution | 800 × 600 × 32bit |  |
|  | Disabled Features | Windows Update |  |
|  | Background | ExampleLogo.bmp |  |
|  | Hostname | DC02 |  |
|  | IP | 10.3.94.57 |  |
|  | Template | Windows 2008 |  |
|  | MAC | 00:69:69:07:08:90 |  |
|  | Screen Resolution | 1024 × 768 × 32-bit |  |
|  | Disabled Features | Windows Update |  |
|  | Background | ExampleLogo.bmp |  |
|  | . |  |  |
|  | . |  |  |
|  | . |  |  |
| Active Hosts | Hostname | EX-JSMITH |  |
|  | IP | 10.3.95.156 |  |
|  | Template | Windows XP SP3 |  |
|  | MAC | 00:0C:05:87:45:67 |  |
|  | Screen Resolution | 1024 × 768 × 32-bit |  |
|  | Disabled Features | Windows Update |  |
|  | Background | ExampleLogo.bmp |  |
|  | Sample | PhishingDoc.rtf |  |
|  | . |  |  |
|  | . |  |  |
|  | . |  |  |

In implementations that can create and run multiple virtual organizations 110 simultaneously, an administrative server (not shown in FIG. 2, but which can host the incubator system generator engine 250 in some implementations) can query the database 270 periodically to check for new configurations. Upon finding one, the administrative server can create a deployment object. When executed, for example on the incubator system 105, the deployment object can create all the entities, components, and networks needed to simulate an organization in the form of the virtual organization 110.

The fully instantiated configuration, which runs as the virtual organization 110, is very realistic so as to make the malware operators 121-123 believe that they are interacting with a real system belonging to a real organization. For example, the virtual organization 110 can include domain controllers, which simulate an active directory environment and control the various nodes in the virtual organization, and also include nodes that represent user machines and can have legitimate software installed on them, such as Adobe® reader, Microsoft Office®, and the like. The virtual organization 110 can also include a custom module that creates emails in the simulated system.

Creating a Virtual Organization

Figure 3:
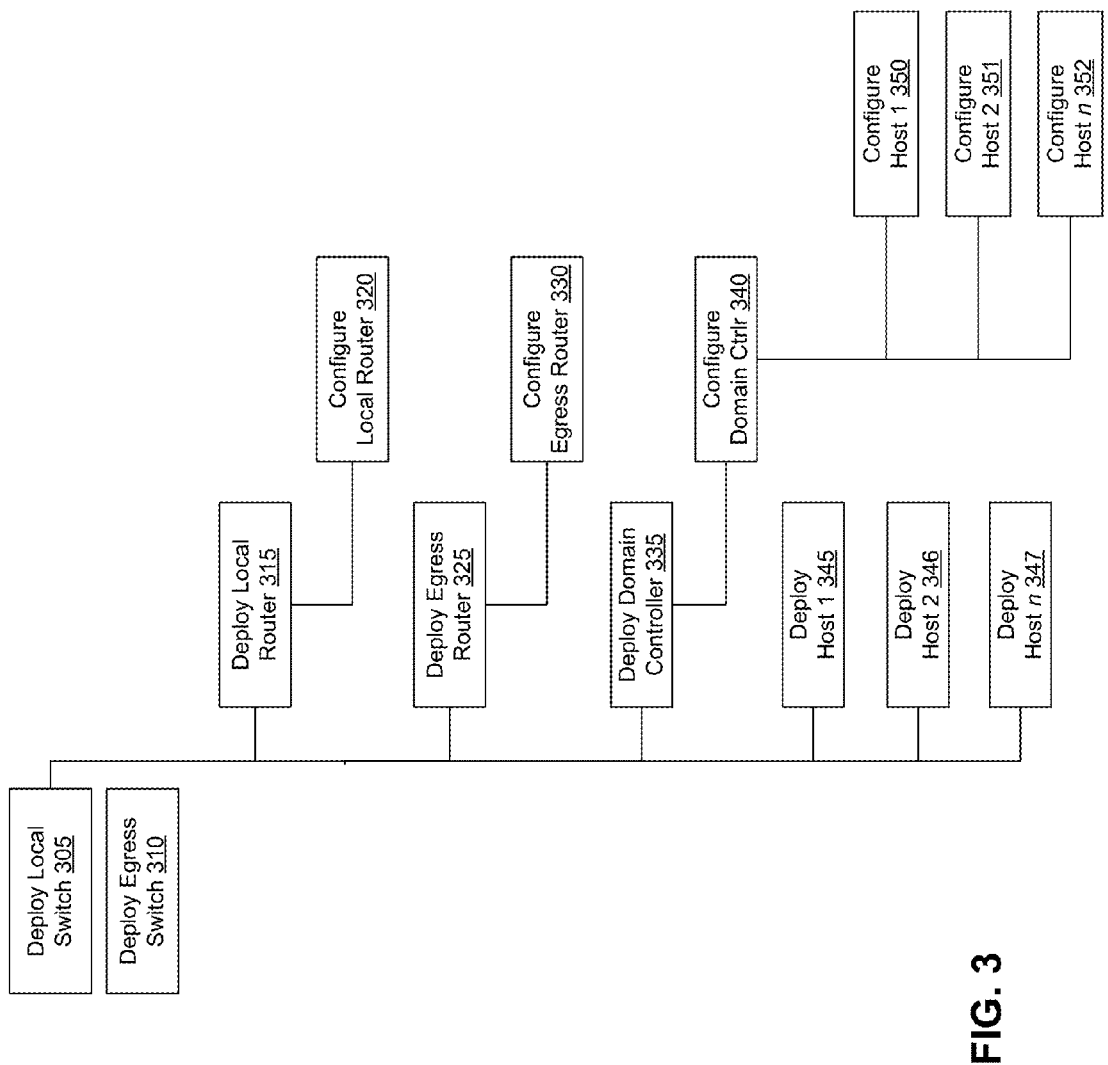
FIG. 3 is a Gantt chart depicting an example of a technique for creating a network for a virtual organization, consistent with the principles of the invention.

FIG. 3 is a Gantt chart depicting an example of a technique for creating a network for a virtual organization, consistent with the principles of the invention. In the example shown, looking left to right, tasks to the right depend upon connected task(s) on the left being completed before the right-hand tasks can be started.

In some implementations, an administrative server (not shown) is programmed to create the virtual organization 110 according to the information stored in the database 270 and/or the configuration file 260. In some implementations the administrative server can deploy and configure some parts and components (e.g., switches, routers, host machines, etc.) in parallel to reduce the amount of time needed to build the entire network of the virtual organization 110.

In various implementations, the malware 115 that is to be "incubated" in the virtual organization 110 has previously been identified and copied, such that it can be loaded into at least one machine of the network of the virtual organization 110 and run indefinitely, with the goal of drawing one or more of the malware operators 121-123 to interact with it. This is unlike a honeypot, a honeynet, or a sandbox, which typically run for a short time with public network connections and wait to be infected or otherwise exploited by malware and malware operators, in contrast with system 100, which intentionally infects some part of the virtual organization 110 with the malware 115. To aid their need to be infected from the outside, honeypots, honeynets, and sandboxes typically run vulnerable services (e.g., older, unpatched versions of applications and OSes, which have known security flaws). Again in contrast, the virtual organization 110 does not typically run vulnerable services because "easy" targets may arouse suspicion in the malware operators 121-123, causing them to logoff and leave instead of interacting with the virtual organization 110. To avoid this, the incubator operator 130 can run services that are fairly up-to-date so as to look like a well-maintained corporate network.

In order to create a functioning virtual organization 110, the incubator system generator engine 250 can build, deploy, or otherwise activate the parts of the virtual organization 110 in a specific sequence at specific times. In the example shown in FIG. 3, the incubator system generator engine 250 first deploys a local switch 305 and an egress switch 310, for example, by activating switches in the incubator system 105.

After those activities are successfully completed, the incubator system generator engine 250 then deploys a local router(s) 315, deploys an egress router(s) 325, deploys a domain controller(s) 335, and deploys in 345-347 a number n of hosts 1 . . . n, such as XP hosts, Windows 7 hosts, Mac hosts, Linux hosts, and the like. In the example shown in FIG. 3, 315, 325, 335, and 345-347 can occur in parallel, to reduce the build time for the virtual organization 110.

After the local router(s) is deployed, the incubator system generator engine 250 can configure the local router(s) 320. Similarly, after the egress router(s) is deployed, the incubator system generator engine 250 can configure the egress router(s) 330, and after the domain controller is deployed, configure the domain controller(s) 340.

Finally, after configuring the domain controller(s), the incubator system generator engine 250 can configure in 350-352 a number n of hosts. In various implementations, the incubator system generator engine 250 enforces the specific order in which deployment and configuration must take place in the incubator system 105 in order for the network of the virtual organization 110 to successfully function. Moreover, the parallelization of some activities allows the setup of multiple hosts, etc., without markedly increasing the setup time. Other features may be added to the example shown in FIG. 3. For example, the example system can generate documents and then deploy the documents to configured hosts.

In various implementations, the incubator system 105 can be robust enough to recover from errors. For example, if a domain controller fails, the incubator system 105 can automatically kill the operations of all the other components, because nothing can work without the domain controller, and restart the startup sequence, for example as shown in FIG. 3. In various implementations, the incubator system 105 can detect whether instantiation of the virtual organization 110 succeeded, and retry as necessary, without human input.

As noted previously with respect to FIG. 1, after the incubator system 105 and virtual organization 110 are set up and running, including running malware 115 in one or more of the machines in the virtual organization 110, the incubator system 105 can track some or all of the activity in the virtual organization 110 (which includes activity in the malware 115), and record or otherwise save that activity in a database 140 for examination and use by the incubator operator 130. Thus, if, for example, the malware operator 121 interacts with the virtual organization 110 and deploys new malware (i.e., malware other than malware 115, such as an additional-stage malware) on a machine of the virtual organization 110, the incubator system 105 can record that event and notify the incubator operator 130. The incubator operator 130 can, in turn, create a copy of the new malware to safely study, profile, and extract useful information, which can be used to benefit other users or systems that are infected by the new malware.

As noted previously with respect to FIG. 1, by recording all or some portion of the events and actions caused or performed by each malware operator 121-123, the incubator system 105 can build the profiles 142-146 for the malware operators 121-123 that interact with the malware 115 running in the virtual organization 110 of the incubator system 105. The profiles 142-146 allow for later identification of one or more of the malware operators 121-123 at a different time in connection with different infected victim systems by, for example, recognition of a specific series of events within a specified period of time that are characteristic of a specific one of the profiled malware operators 121-123.

Similarly, the constant monitoring by the incubator system 105 and comparison with the profiles 142-146 allows the incubator operator 130 to detect a change in the malware operator 121-123 who is accessing the virtual organization 110, such as, for example, when one malware operator 121-123 hands off to another. For example, the incubator operator 130 can detect a change in what the malware operator 121-123 is doing, or in the pattern of how he is doing it—e.g., what actions he is performing, when he performing them, in what order he is performing them—and conclude that a different malware operator is accessing the virtual organization 110 because different individuals behave differently.

Moreover, after recording and analyzing what malware operators 121-123 have done with or deployed to the virtual organization 110, the incubator operator 130 can develop one or more countermeasures. For example, if one or more of the malware operators 121-123 deploy a new malware program on a machine of the virtual organization 110, the incubator operator 130 can reverse engineer the new malware program, create intelligence alerts for the white-hat community, and perhaps develop countermeasures (e.g., write a patch or application) to neutralize the new malware program.

Figure 4:
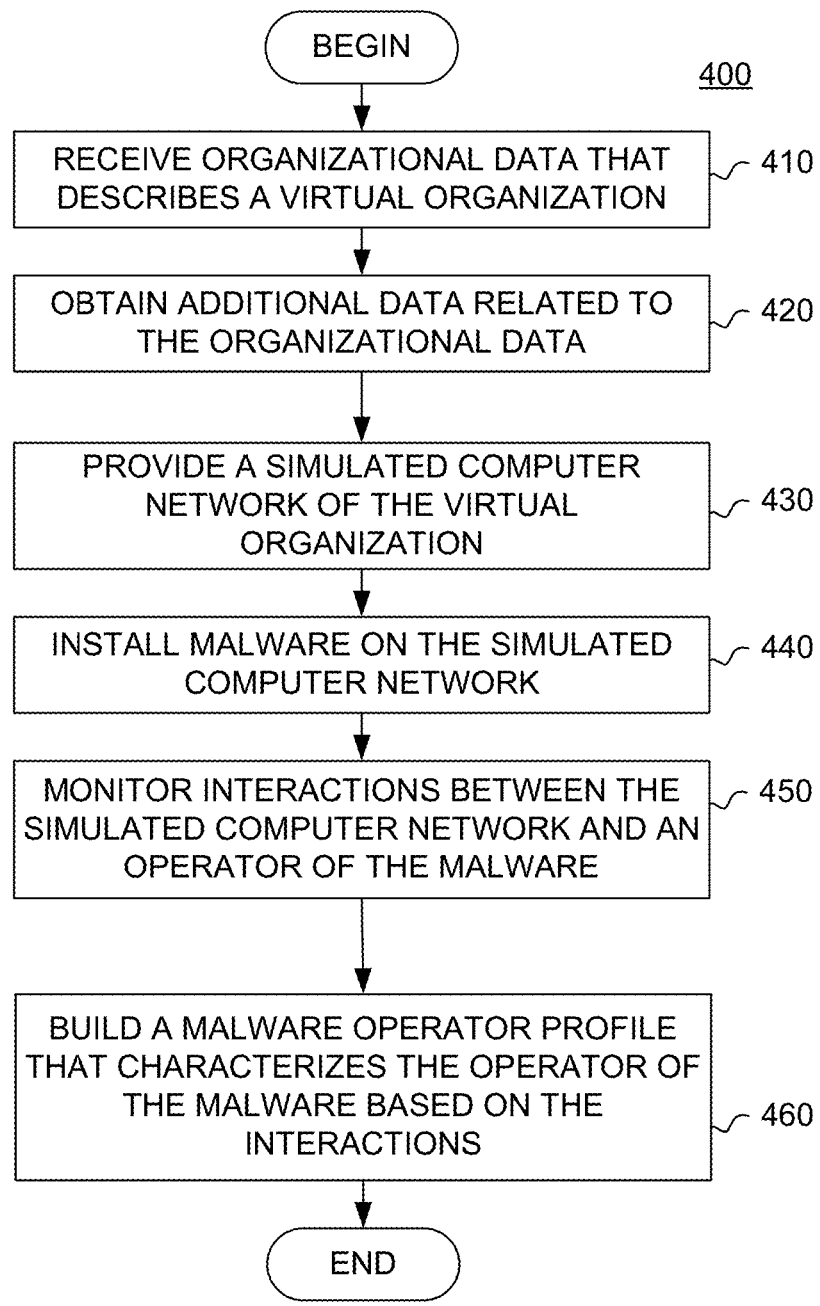
FIG. 4 is a flow diagram of an example process performed for creating and using an incubator environment to host and study malware and malware operators, consistent with the principles of the invention.

FIG. 4 is a flow diagram of an example process 400 performed by an incubation system for creating and using an incubator environment to host and study malware and malware operators, consistent with the principles of the invention. The process 400 can be performed by the incubation system, which can include a generator system (e.g., the generator system 200 as shown in FIG. 2) and a system for incubating malware (e.g., the system 100 for incubating malware as shown in FIG. 1).

At block 410, the incubation system can receive organizational data that describes a virtual organization (e.g., the virtual organization 110 as shown in FIG. 1).

Then, at block 420, the incubation system can obtain additional data related to the organizational data. As discussed above, the additional data can be retrieved from the Internet or other databases using one or more keywords related to the organizational data. The additional data can include information such as documents, links, identities and the like to make the virtual organization appear more realistic.

The incubation system can, at block 430, provide a simulated computer network of the virtual organization based at least partially on the organizational data, the additional data, or both.

The incubation system can then, at block 440, install at least one malware on the simulated computer network.

The incubation system can then, at block 450, monitor one or more interactions between the simulated computer network and an operator of the malware. While monitoring the virtual organization, the incubation system can track and record the interactions. In one example, the incubator operator can monitor the one or more interactions on a monitor or other display device. In another example, the incubation system can alert the incubator operator (via, e.g., text messages, emails, etc.) when the incubation system detects the one or more interactions between the operator of the malware and the simulated computer network.

The incubation system can then, at block 460, build a malware operator profile that characterizes the operator of the malware based on the one or more interactions. This can be used to identify the malware operator when the malware operator interacts with a different (e.g., non-simulated/real) computer network. The malware operator profile can also be used to design or build a security program for the different (e.g., non-simulated/real) computer network that is configured to identify, based upon the malware operator profile, when the operator of the malware is accessing the different (e.g., non-simulated/real) computer network. The security program can also be configured to protect the different (e.g., non-simulated/real) computer network (e.g., by blocking the operator of the malware).

FIG. 5 shows an exemplary computing system 500 consistent with the principles of the invention. One or more computing systems similar to computing system 500 and/or the entire system as shown in FIG. 5 can be used to implement the incubator system 105 as shown in FIG. 1 and/or the incubator system generator engine 250 as shown in FIG. 2. In some implementations, the database 570 can be used to implement the database 140 as shown in FIG. 1 and/or the database 270 as shown in FIG. 2.

Certain embodiments of the incubator system 105 or the incubator system generator engine 250 can be implemented or embedded as a computer program. The computer program can exist in a variety of forms both active and inactive. For example, the computer program can exist as software program(s) comprised of program instructions in source code, object code, executable code or other formats; firmware program(s); or hardware description language ("HDL") files. Any of the above can be embodied on a computer readable medium, which include storage devices and signals, in compressed or uncompressed form. However, for purposes of explanation, the computing system 500 is shown as a general purpose computer that is well known to those skilled in the art. Examples of the components that may be included in the computing system 500 will now be described.

As shown, the computing system 500 can include at least one CPU 505, a working memory 510, at least one storage 520, one or more input/output ("I/O") devices 530 (e.g., a keyboard, a pointing device, a display, a printer, etc.), and at least one I/O controller 535. The storage 520 can comprise, for example, RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. A copy of the computer program embodiment of the incubator system 105 or the incubator system generator engine 250 can be stored on, for example, the storage 520. The various components of the computing system 500 communicate through a system bus 540 or similar architecture. In addition, the computing system 500 can include an operating system ("OS") 512 that resides in the working memory 510 during operation. One skilled in the art will recognize that the CPU 505 can include multiple processors. For example, the CPU 505 can include multiple copies of the same processor. Alternatively, the CPU 505 can include a heterogeneous mix of various types of processors. For example, the CPU 505 can use one processor as a primary processor and other processors as co-processors. For another example, the CPU 505 can include one or more multi-core processors and one or more single core processors. Thus, the computing system 500 can include any number of execution cores across a set of processors. As to the keyboard, the pointing device, and the display, these components may be implemented using components that are well known to those skilled in the art. One skilled in the art will also recognize that other components and peripherals may be included in the computing system 500.

The OS 512 is an integrated collection of routines and instructions that are responsible for the direct control and management of hardware in the computing system 500 and system operations. Additionally, the OS 512 provides a foundation upon which to run application software and device drivers, such as one or more application 515. For example, the OS 512 can perform services, such as resource allocation, scheduling, input/output control, and memory management. The OS 512 can be predominantly software, but can also contain partial or complete hardware implementations and firmware. Well known examples of operating systems that are consistent with the principles of the present teachings include MICROSOFT WINDOWS (e.g., WINDOWS CE, WINDOWS NT, WINDOWS 2000, WINDOWS XP, and WINDOWS VISTA), MAC OS, LINUX, UNIX, ORACLE SOLARIS, OPEN VMS, and IBM AIX.

The working memory 510 serves as a primary storage area of the computing system 500 and holds data that is actively used by the applications 515 running on CPU 505. The applications 515 can include at least one copy of the computer program embodiment of the incubator system 105 and/or the incubator system generator engine 250. One skilled in the art will recognize that the applications 515 are software programs that each contains a set of computer instructions for instructing the computing system 500 to perform a set of specific tasks during runtime, and that the term "applications" may be used interchangeably with application software, application programs, device drivers, and/or programs in accordance with embodiments of the present teachings. The working memory 510 can be implemented as a random access memory or other forms of memory as described below, which are well known to those skilled in the art.

As shown in FIG. 5, the computing system 500 can be connected to a network 550 and to a remote computer 560 and a database 570 via the network 550. The computing system 500 and/or the entire system shown in FIG. 5 can be used to implement embodiments consistent with the invention.

The foregoing description is illustrative, and variations in configuration and implementation may occur to persons skilled in the art. For instance, the various illustrative logics, logical blocks, modules, and circuits described in connection with the embodiments disclosed herein may be implemented or performed with a general purpose processor (e.g., the CPU 505), an application specific integrated circuit, a field programmable gate array or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a microprocessor, a plurality of microprocessors, or any other such configuration.

In one or more exemplary embodiments, the functions described may be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

If implemented in software, the functions may be stored on or transmitted over a computer-readable medium as one or more instructions or code. Computer-readable media includes both tangible, non-transitory computer storage media and communication media including any medium that facilitates transfer of a computer program from one place to another. A storage media may be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

Resources described as singular or integrated can in one embodiment be plural or distributed, and resources described as multiple or distributed can in embodiments be combined. The scope of the present teachings is accordingly intended to be limited only by the following claims. Although the invention has been described with respect to specific embodiments, those skilled in the art will recognize that numerous modifications are possible. For instance, the proxy servers can have additional functionalities not mentioned herein. In addition, embodiments of the present disclosure can be realized using any combination of dedicated components and/or programmable processors and/or other programmable devices. While the embodiments described above can make reference to specific hardware and software components, those skilled in the art will appreciate that different combinations of hardware and/or software components can also be used and that particular operations described as being implemented in hardware might also be implemented in software and vice versa.

What is claimed is:

1. A system for tracking malware operator behavior patterns in a network environment simulated for an extended period of time, comprising:
    a non-transitory memory storing instructions; and
    a processor device executing the instructions to cause the system to perform a method comprising:
        receiving organizational data that describes a virtual organization, wherein the organizational data comprises a plurality of simulated users that are logged into a plurality of simulated machines;
        creating user profiles for the plurality of simulated users using career detail information obtained from searching a website so that the user profiles are compatible with the virtual organization;
        providing, using the processor device, a simulated computer network of the virtual organization based at least partially on the organizational data and the user profiles, wherein after the simulated computer network is provided, at least one malware is installed on the simulated computer network to create an incubator;
        monitoring one or more interactions between the simulated computer network and an operator of the malware, wherein the one or more interactions comprise the operator of the malware illicitly gathering information related to the user profiles; and
        building a malware operator profile that characterizes the operator of the malware based on the one or more interactions.

2. The system of claim 1, wherein the organizational data includes at least one of a characteristic, a feature, or an attribute of the virtual organization.

3. The system of claim 2, wherein the method further comprises providing a user interface based on the organizational data of the virtual organization to obtain the career detail information for the plurality of simulated users.

4. The system of claim 2, wherein the organizational data includes at least one of a domain, a number of users, an industry, a keyword, or malware information.

5. The system of claim 1, wherein the organizational data includes at least one keyword associated with the virtual organization, wherein the method further comprises obtaining the career detail information based on the at least one keyword, and wherein the career detail information includes a personnel hierarchy, personnel identities, or both.

6. The system of claim 5, wherein the personnel identities include at least one of a personnel name, a job position, or a job title.

7. The system of claim 1, wherein the organizational data includes an industry and at least one keyword associated with the virtual organization, wherein the method further comprises obtaining the career detail information based on the industry and the at least one keyword, and wherein the career detail information includes one or more documents associated with the industry.

8. The system of claim 1, wherein the simulated computer network includes a plurality of nodes, and wherein the method further comprises installing the at least one malware in at least one of the plurality of nodes in the simulated computer network.

9. The system of claim 8, wherein the plurality of nodes includes at least one of a computing machine or a network router.

10. The system of claim 1, wherein the method further comprises providing the simulated computer network of the virtual organization for a predetermined period of time that is greater than one day.

11. The system of claim 10, wherein the method further comprises monitoring the one or more interactions between the simulated computer network and the operator of the malware for the predetermined period of time.

12. The system of claim 1, wherein the method further comprises identifying the operator of the malware based on the malware operator profile subsequent to detecting the one or more interactions between the operator of the malware and the simulated computer network.

13. The system of claim 12, wherein the malware operator profile is used to identify the operator of the malware when the operator of the malware interacts with a different computer network.

14. The system of claim 1, wherein the career detail information comprises real documents from the website.

15. The system of claim 1, wherein the operator of the malware installs the at least one malware on the simulated computer network.

16. A computer-implemented method for tracking malware operator behavior patterns in a network environment simulated for an extended period of time, comprising:
  receiving organizational data that describes a virtual organization, wherein the organizational data comprises a plurality of simulated users that are logged into a plurality of simulated machines;
  creating user profiles for the plurality of simulated users using career detail information obtained from searching a website so that the user profiles are compatible with the virtual organization;
  providing, using a processor device, a simulated computer network of the virtual organization based on the organizational data and the user profiles, wherein after the simulated computer network is provided, at least one malware is installed on the simulated computer network to create an incubator;
  monitoring one or more interactions between the simulated computer network and an operator of the malware, wherein the one or more interactions comprise the operator of the malware illicitly gathering information related to the user profiles; and
  building a malware operator profile that characterizes the operator of the malware based on the one or more interactions.

17. The method of claim 16, further comprising alerting a user when the one or more interactions occur.

18. The method of claim 16, further comprising building a security program that is configured to identify, using the malware operator profile, when the operator of the malware attempts to access a different computer network.

19. The method of claim 18, wherein the security program is configured to block the operator of the malware from accessing the different computer network.

20. A non-transitory computer-readable storage medium including instructions which when executed by a processor device, cause the processor device to track malware operator behavior patterns in a network environment simulated for an extended period of time by performing operations comprising:
  receiving organizational data that describes a virtual organization, wherein the organizational data comprises a plurality of simulated users that are logged into a plurality of simulated machines;
  creating user profiles for the plurality of simulated users using career detail information obtained from searching a website so that the user profiles are compatible with the virtual organization;
  providing, using the processor device, a simulated computer network of the virtual organization based on the organizational data and the user profiles, wherein after the simulated computer network is provided, at least one malware is installed on the simulated computer network to create an incubator;
  monitoring one or more interactions between the simulated computer network and an operator of the malware, wherein the one or more interactions comprise the operator of the malware illicitly gathering information related to the user profiles; and
  building a malware operator profile that characterizes the operator of the malware based on the one or more interactions.

* * * * *